UNITED STATES PATENT OFFICE.

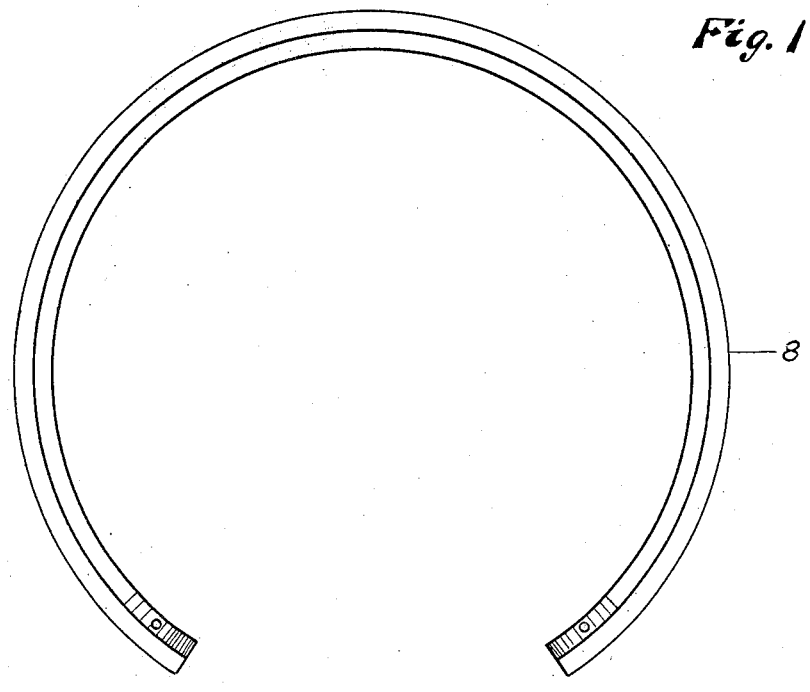

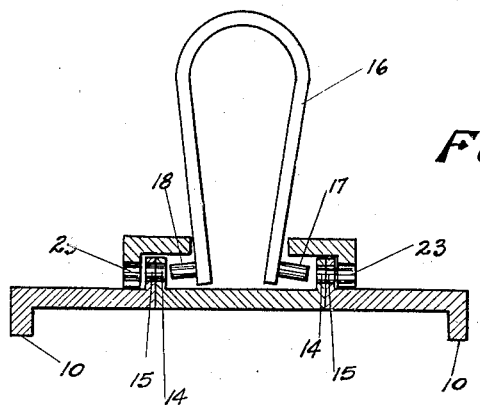
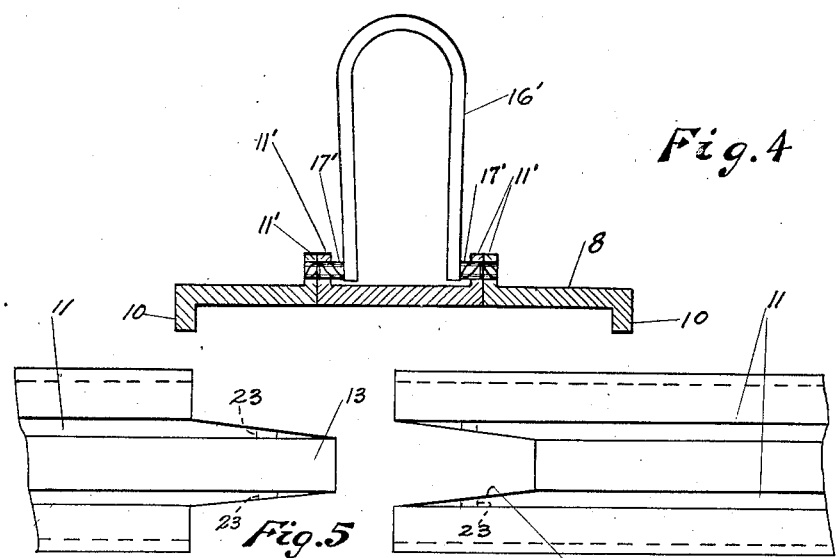
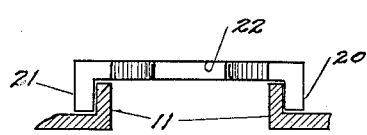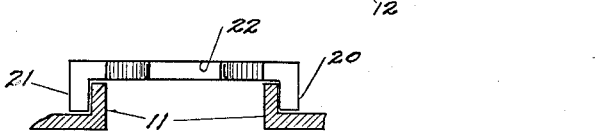

FREDERICK H. CAMPBELL, OF CHICAGO, ILLINOIS, ASSIGNOR OF ONE-FOURTH TO CLIFTON R. HUNN, OF CHICAGO, ILLINOIS.

VEHICLE-WHEEL RIM.

1,380,350.  Specification of Letters Patent.  Patented June 7, 1921.

Application filed May 8, 1920. Serial No. 379,749.

*To all whom it may concern:*

Be it known that I, FREDERICK H. CAMPBELL, a citizen of the United States, and a resident of the city of Chicago, county of Cook, and State of Illinois, have invented certain new and useful Improvements in Vehicle-Wheel Rims, of which the following is a specification.

My invention relates to new and useful improvements in vehicle wheel rims, and has for its object the provision of a vehicle wheel rim which will be simple in structure, economic of manufacture, and highly efficient in use. Another object is the provision in a vehicle wheel rim of means for quickly and easily removing the tire therefrom. Another object is the provision of a sectional vehicle wheel rim and means for securing said sections together. Another object is the provision of a sectional vehicle wheel rim having the sections secured together, and means for quickly detaching the same.

Other objects will appear hereinafter.

The invention consists in the combination and arrangements of parts hereinafter described and claimed.

The invention will be best understood by reference to the accompanying drawings forming a part of this specification, and in which, Figure 1, is an elevation of the invention, Fig. 2, is a fragmentary plan view showing the joint in the invention, Fig. 3, is a sectional view taken on substantially line 3—3 of Fig. 2, Fig. 4, is a sectional view similar to Fig. 3, illustrating a modified form, Fig. 5, is a fragmentary plan view illustrating the formation of the engaging ends of the rim, Fig. 6, is a sectional view illustrating the disengaging plate used in the invention.

The preferred form of construction comprises a vehicle wheel rim 8 such as is generally used upon automobile wheels, and is provided with a section 9. In constructing the vehicle wheel rim, a plurality of sections 9 may be used, or merely a single section.

As shown, the rim is provided with the usual tire retaining flanges 10 and the usual bead 11 which extends circumferentially around the inner surface of the rim. As shown in Fig. 5, one of the meeting ends of the rim is provided with an abruptly terminated V-shaped slot 12 in which is adapted for engagement a tongue or wedge 13 formed upon the adjacent end of the adjacent section. As shown, the bead 11 is split diagonally at the slot 12 and the tongue 13 is engaged in the recess or slot 12. In that portion of the bead 11 which is on the tongue 13, there are provided openings 14, the openings 14 in the opposite beads being in alinement. When the tongue is in engagement in the recess 12, the openings 14 register with openings 15 provided in that portion of the bead 11 which is on the member 12. In order to lock the adjacent ends of these parts together a U-shaped member 16 is provided which is made from some resilient or spring material. Projecting laterally from the ends of the member 16 are studs 17 and 18 which are adapted to engage in the openings 14 and 15 for locking the sections in assembled relation. By springing the ends of the member 16 inwardly toward each other, the studs 17 and 18 are disengaged from the openings 14 and 15 and the sections thereby permitted to be separated from each other. To facilitate the springing inwardly of the ends of the member 16, I have mounted upon the inner surface of the rim a plate 19 which may be secured to the rim by welding or other suitable means. As shown in Fig. 6, the plate 19 is provided with flanges 20 and 21 at its opposite sides which are adapted to embrace the beads 11. The member 19 is provided with an elongated V-shaped slot or recess 22 and so positioned that upon raising the member 16 vertically relative to the section to which attached the legs of the members 16 engage against the edges of the member 19 at the V-shaped opening, and the ends of said U-shaped member are sprung inwardly thereby disengaging the studs 17 and 18 from the sections which they bind together.

Some vehicle wheel rims are not provided with the circumferential extending beads 11 in which case, suitable lugs may be mounted upon the inner surface of the rim for receiving the studs 17 and 18.

In Fig. 4, I have shown a modified form wherein the plate 19 is dispensed with, and the studs 17' which are attached to the ends of the legs of the member 16' are provided with a worm thread, and the beads 11' are also provided with a worm thread, so that upon raising the member 16' vertically relatively to the tire rim 8, the studs 17' are withdrawn from the opening formed in the bead or lug on one of the sections thereby causing a detachment of the parts.

This invention is designed for use in facilitating the removal of the tire from the wheel rim, after the rim has been removed from the wheel itself. When the device is on the wheel the member 16 is retained in a position extending longitudinally or circumferentially of the rim, and is not accessible for detaching the parts of the rim. After the rim has been removed from the wheel, however, the removal of the tire will be facilitated by removing one or more of the sections 9.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A vehicle wheel rim comprising a sectional annular member mountable on a vehicle wheel; a tongue provided on the end of one section adapted for engagement in a recess formed in the adjacent end of a co-operating section; and a resilient member provided with lugs for securing said tongue in said engagement, substantially as described.

2. A vehicle wheel rim comprising a sectional annular member mountable on a vehicle wheel; a tongue provided on the end of one section adapted for engagement in a recess formed in the adjacent end of a co-operating section; members extending inwardly from said sections at the place of engagement of said tongue in said recess, said members having registering openings formed therein; means for projecting through said openings for securing said members in fixed relation to each other; and means including a resilient member for withdrawing said securing means from said openings, substantially as described.

3. A vehicle wheel rim comprising a sectional annular member mountable on a vehicle wheel; a tongue provided on the end of one section adapted for engagement in a recess formed in the adjacent end of a co-operating section; members extending inwardly from said sections at the place of engagement of said tongue in said recess, said members having registering openings formed therein; means for projecting through said openings for securing said members in fixed relation to each other; and means including a slotted member for withdrawing said securing means from said openings, substantially as described.

4. A vehicle wheel rim comprising a sectional annular member mountable on a vehicle wheel; a tongue provided on the end of said section adapted for engagement in a recess formed in the adjacent end of a co-operating section; means projecting inwardly from said ends of said sections having openings formed therein; a U-shaped member; means mounted on the ends of said U-shaped member for projection through said openings for locking said sections in fixed relation, substantially as described.

5. A vehicle wheel rim comprising a sectional annular member mountable on a vehicle wheel; a tongue provided on the end of said section adapted for engagement in a recess formed in the adjacent end of a co-operating section; means projecting inwardly from said ends of said sections having openings formed therein; a U-shaped member; means mounted on the ends of said U-shaped member for projection through said openings for locking said sections in fixed relation; and means for moving the ends of said U-shaped member toward each other for withdrawing said securing means from said openings, substantially as described.

6. A vehicle wheel rim comprising a sectional annular member mountable on a vehicle wheel; a tongue provided on the end of said section adapted for engagement in a recess formed in the adjacent end of a co-operating section; means projecting inwardly from said ends of said sections having openings formed therein; a U-shaped member; means mounted on the ends of said U-shaped member for projection through said openings for locking said sections in fixed relation; and means for moving the ends of said U-shaped member toward each other for withdrawing said securing means from said openings upon the raising of said U-shaped member vertically relatively to said sections, substantially as described.

7. A vehicle wheel rim comprising a sectional annular member mountable on a vehicle wheel; a tongue provided on the end of one section adapted for engagement in a recess formed in the adjacent end of a co-operating section; inwardly projecting members on said sections at said end having registering openings therein; a substantially V-shaped slot bearing member mounted on one of said sections at said end; means for projecting through said openings for binding said sections in fixed relation; and means adapted to engage the edges of said V-shaped slot for withdrawing said locking means from said openings, substantially as described.

In testimony whereof I have signed my name to this specification in the presence to two subscribing witnesses.

FREDERICK H. CAMPBELL.

Witnesses:
JOSHUA R. H. POTTS,
THOS. S. DONNELLY.